UNITED STATES PATENT OFFICE.

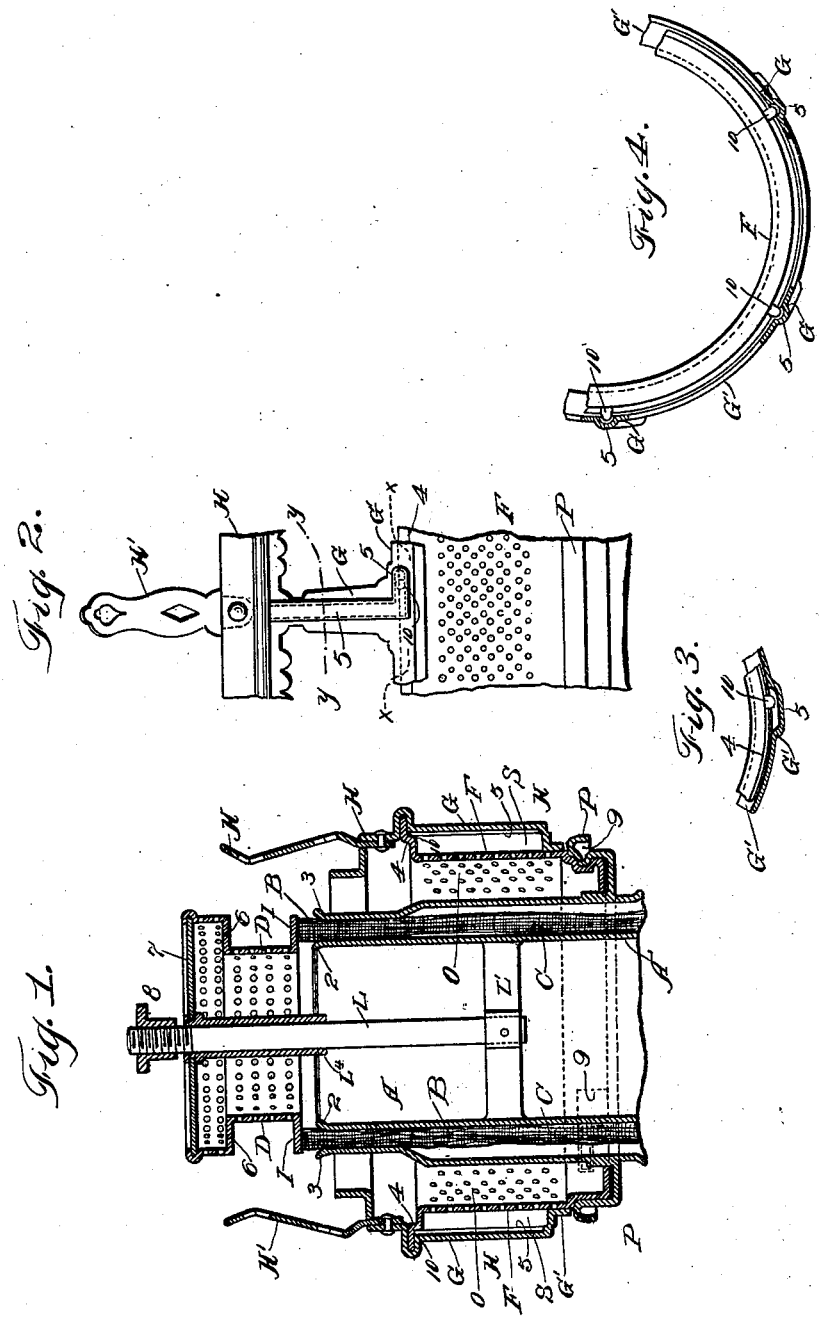

JOSEPH GREGORY, OF NEW YORK, N. Y.

LAMP-BURNER.

SPECIFICATION forming part of Letters Patent No. 693,006, dated February 11, 1902.

Application filed June 24, 1899. Serial No. 721,721. (No model.)

*To all whom it may concern:*

Be it known that I, JOSEPH GREGORY, a citizen of the United States, residing at New York, in the county of New York and State of New York, have invented a new and useful Improvement in Lamp-Burners, of which the following is a specfication.

This invention relates to oil-lamps embodying in their construction a circular wick-tube and a circular wick, the air being supplied exteriorly and also centrally of the wick and the flame being spread by means of a spreader that moves vertically with the wick.

The principal object of this invention is the flame-spreader and wick-guard terminating entirely above the upper plane of the inner wick-tube to prevent both the flame and the heat of the spreader and guard from charring the upper inner edge of the wick, and an airtight guard around the spreader forcing the gas from the upper inner surface of the wick to pass into the central draft, where it mingles with a sufficient quantity of air before passing out through the perforations in the spreader to the flame. Practice demonstrates that a guard covering the upper inside surface of the wick will prevent the flame from charring the wick, but it will allow the heat of the spreader and guard to char the wick. The form of spreader and guard disclosed in my drawings overcome both of these objections at once, and by forcing the gas from the inside surface of the wick to pass into the spreader a whiter light is had and the wick is preserved, as these spreaders now in general use will show.

The improvement is susceptible of various changes in the form, proportions, and the minor details of construction without departing from the principle or sacrificing any of the advantages thereof.

For a full knowledge of the invention reference is to be had to the accompanying drawings and the following description.

Figure 1 is a central vertical section of a lamp-burner having the improvements applied thereto. Fig. 2 is a side elevation of a portion of the chimney-holder and one of its supports, such holder being represented in an elevated position. Fig. 3 is a section at the line $x$ $x$ of Fig. 2, and Fig. 4 is a section at the line $y$ $y$ of Fig. 2 with the lugs of the air-distributer in the vertical channels of the gallery-support.

The wick-tube is of cylindrical form and comprises the inner casing A and an outer casing C. Between the opposing walls is a space in which the wick B is received. The inner and outer casings have their upper end portions 2 and 3 flared away from the wick to prevent the overflow of oil. The perforated cone or the spreader D carries a guard-ring 1, adapted to rest upon the top of the wick B, and there is an imperforate deflector 6 a fixed distance above the guard-ring 1, that rises and lowers with the wick B. The guard-ring 1 (shown in Fig. 1) can be made integral with the perforated cone or spreader D by flanging outwardly the lower end of said spreader. The deflector 6 is preferably integral with the spreader for convenience in manufacturing; but a ring secured to the cone or spreader at the same point would attain the same result, its office being to force the air passing out of the cone or spreader below the deflector into the flame.

In small lamps the guard-ring may be perforated; but in large lamps it is preferable not to perforate it, as it serves the double purpose of guard and extinguisher, as large lamps are hard to extinguish. If the body of the perforated cone or spreader D is made small, it is advantageous to perforate the guard-ring. The tube $L^4$, centrally disposed within the cone or spreader D and having its upper end securely fastened to the cap 7 of the cone or spreader, is adapted to fit the center rod L loose enough to allow the spreader to fall of its own weight when the wick B is lowered. It will be seen that this tube serves as a guide, in connection with the center rod L, to keep the cone or spreader D in line above the wick and prevent the spreader from careening.

The center rod is fastened inside the air-tube A by a bridge L', and the rod passes up through the cone or spreader D far enough to receive a nut 8, which is threaded in the usual manner. When the nut 8 is set at any point on the upper end of the rod L, it will act as a stop to the spreader D and prevent it from being raised too high. The nut is very necessary in lamp-stoves, where the wick B is hid from view, inasmuch as it indicates the safety-point, below which there is no danger of smoking.

In open-top lamps the nut 8 may be left off without interfering with the burning of the lamp, its function being to determine the height of the flame. The centrally-disposed rod L is the guide for the cone or spreader D, and it acts as a stop, in connection with the nut 8, and it keeps the cone or spreader D in a true vertical line above the wick B.

Around the outer wick-casing C and secured to the base-ring P of said casing in the usual manner, preferably by bayonet-locks 9, is a perforated air-distributer F and gallery-support, having a suitable space O between the air-distributer F and the outer wick-casing C for the free passage of the air to the flame, and its upper edge is flanged outwardly at 4 and provided with a series of lugs or projections on the outer edge of the flange, as at 10. Around the air-distributer F is a telescoping gallery H, adapted to be elevated for the purpose of lighting the lamp without removing the chimney. The lower edge of the gallery is contracted, as at G', forming a band which fits around the air-distributer F and acts as a guide for the lower edge of the gallery.

Extending upward from the band G' are columns G, having grooves 5 or channels on their inner side corresponding with and adapted to slide over the projections 10. The lower ends of the channels 5 are L-shaped, so that when the gallery is elevated and a slight rotary motion given to it the projections 10 pass into the horizontal lower parts of the channels 5 and hold the gallery in the elevated position until the lamp is lighted, when a slight rotary motion passes the projections 10 back into the vertical channels 5 and the gallery drops back into normal position. The space between the columns may be open ornamental work, having the openings large enough to pass a burning match through for lighting the lamp; but it is preferable to cut away the metal between the columns G, as shown. In lamps heretofore made having telescoping galleries the channels 5 are cut through the sheet metal, making a slot and reducing the strength of the metal. In this construction the metal being forced outwardly, forming a rib and channel 5, the strength of the metal is reinforced.

It will be observed that there is a space at S between the columns and the air-distributer, as in practice I find that anything touching or near the air-distributer F obstructs the air, causing an uneven flame and necessitating another air-distributer between the outer one F and the flame. By having the aforesaid space I find that one air-distributer is sufficient, thereby a saving is had and an even flame obtained.

It will be understood that the wick-guard is fastened to the cone or spreader and may be perforated. The conditions under which it is used will determine this point. It will be understood that the center rod is the guide for the cone or spreader and may be round, flat, or square.

While the part D is herein referred to as a "cone" or "spreader," it will be understood that the same is not necessarily of conical shape.

I claim as my invention—

1. In a central-draft lamp, the combination with an inner wick-tube, of a perforated spreader having a wick-guard coacting with said spreader, said guard preventing the flame from reaching the upper inner surface of the wick, and forcing the gas from the upper inner surface of the wick to pass into the central draft and mingle with air before passing out through the perforations in the spreader to the flame, substantially as described, for the purpose set forth.

2. In a central-draft lamp, the combination with an inner wick-tube, of a vertically-movable perforated spreader having a wick-guard coacting with the spreader to prevent the flame from reaching the upper inner surface of the wick and force the gas from that portion of the wick to pass into the central draft, and the spreader and guard terminating above the upper plane of the inner wick-tube to prevent the heat of the spreader and guard from charring the upper inside surface of the wick, substantially as described.

3. In a central-draft lamp, the combination with an inner wick-tube, of a vertically-movable perforated spreader having a guard coacting with the spreader to prevent the flame from reaching the upper inside surface of the wick and compel the gas from that portion of the wick to pass into the central draft, a centrally-disposed rod to limit the upward movement of the spreader and guard, said spreader and guard terminating above the upper plane of the inner wick-tube to prevent the heat of the spreader and guard from charring the upper inside surface of the wick, substantially as set forth.

4. In a central-draft lamp, the combination with an inner wick-tube, of a spreader, a guard coacting with the spreader to prevent the flame from reaching the upper inside surface of the wick, an opening below the guard through which the gas from the upper inside surface of the wick is forced to pass into the central draft and mingle with air before reaching the flame, substantially as described.

5. In a central-draft lamp, the combination with an inner wick-tube, of a perforated spreader, a wick-guard coacting with the spreader to prevent the flame from reaching the upper inside surface of the wick, and the gas from that portion of the wick from reaching the flame before passing through an opening below the guard into the central draft where it mingles with air within the spreader and passes out through the perforations in the spreader to the flame, substantially as described and for the purpose set forth.

6. In a central-draft lamp, the combination with an inner wick-tube, of a spreader coacting with a guard to prevent the flame from reaching the upper inner surface of the wick, and a means for the escape of gas from the inner portion of the wick, substantially as described.

7. In a central-draft lamp, the combination with an inner wick-tube, of a flame-spreader and a wick-guard to prevent the flame from reaching the upper inside surface of the wick and a means for the escape of gas from that portion of the wick to the flame, substantially as described.

8. In a central-draft lamp, the combination with an inner wick-tube, of a flame-spreader and guard, the upper inside surface of the wick uniting with the guard to form the outer and upper walls of the gas-space which communicates with the flame, substantially as described.

9. In a central-draft lamp, the combination with an inner wick-tube, of a flame-spreader and guard forming a gas-space immediately below the guard, the upper inner surface of the wick being uncovered to said gas-space, and a means for the escape of gas from said gas-space, substantially as described.

10. In a central-draft lamp, the combination of a wick, and a coacting flame-spreader and guard to inclose a gas-space which communicates with the flame and prevents the flame from reaching the inner side of the wick, substantially as described.

11. In a central-draft lamp, a perforated flame-spreader having a guard to bear on the upper edge of the wick to prevent the flame from reaching the inner side of the wick, the perforations in said spreader permitting the passage of gas from the inner side of the wick to the flame, substantially as described.

12. In a lamp-burner, a vertically-movable flame-spreader having a guide-tube, in combination with a fixed guide-rod, engaged by said guide-tube, and means on said guide-rod above said flame-spreader, to limit the vertical movement of said flame-spreader on said guide-rod, substantially as described.

13. In a lamp-burner, the combination of an inner wick-tube, a fixed vertical guide-rod connected thereto and supported thereby, a vertically-movable flame-spreader having a guide-tube engaging said guide-rod, and a stop-nut screwed and adjustable on said guide-rod above said flame-spreader, to limit the vertical movement of the latter, substantially as described.

Signed by me this 21st day of June, 1899.

JOSEPH GREGORY.

Witnesses:
GEO. T. PINCKNEY,
S. T. HAVILAND.